2,875,083

ASPHALTIC COMPOUNDS AND ADDITIVES THEREFOR

Leonard J. Armstrong, Cleveland Heights, and Anton Mudrak, Cleveland, Ohio, assignors to The Harshaw Chemical Company, Cleveland, Ohio, a corporation of Ohio No Drawing. Application August 1, 1955
Serial No. 525,785

2 Claims. (Cl. 106—273)

This invention relates to asphaltic compositions containing additives serving as wet bonding agents and having the structural formula

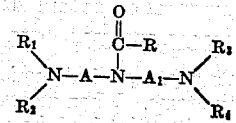

wherein R is an aliphatic radical such as an alkyl or alkenyl radical having from 11–21 carbon atoms, $R_1$ through $R_4$ are alkyl radicals having from 1–4 carbon atoms, and A and A' are straight or branch chain alkylene groups having from 2–4 carbon atoms. The substituted alkyl radicals may be the same in a molecule of the compound or mixtures of the class described. The novel additives may be generically designated as N-dialkylaminoalkyl-N'-dialkylaminoalkyl carboxylic amides.

The additives of this invention may be used alone to impart bonding strength to bituminous compounds or may be utilized together with other compounds such as carboxylic acids for imparting the desired characteristic properties. In general it has been found that the novel additives have the most effective bonding strength when mixed with acidic aggregates although they may be utilized alone with basic aggregates. When employing the bonding agents of the invention with basic aggregate, it is desirable to employ additionally one or more carboxylic acids of the aliphatic type such as oleic or stearic acids, or naphthenic or rosin acids to aid in effecting the bonding characteristic of the novel additive.

As is well known, asphalts, either of the synthetic or natural types, require a bonding agent of one sort or another when wet aggregates are to be bonded as for instance in paving compounds. Some of the bonding agents employed prior to the advent of the invention are such compounds as metallic soaps, fatty acids, surface active amines and amine soaps. Many of these bituminous wetting agents are unsuitable for commercial road paving practices. They lose their bonding properties after prolonged periods at elevated temperatures and it is frequently desirable to maintain the asphalt at elevated temperatures for long periods of time. At the elevated temperatures these bonding agents apparently break down and thereby lose their characteristic wetting property. Consequently, the demands of commerce have developed to the point where the bituminous bonding agents necessarily must withstand certain high temperatures for a prolonged period of time in order to be considered effective and commercially practical. This invention is directed to bituminous compositions containing the indicated disubstituted amides which have been found exceptionally effective as bonding agents and which furthermore are resistant to the adverse effects of high temperatures for prolonged periods such as frequently encountered in road paving practices.

It is an object of the invention to employ the above compounds as additives in asphalt compositions. It is another object to provide for new bituminous compositions which retain their bonding capacity after being subjected to elevated temperatures for prolonged periods of time such as customarily employed in asphalt paving operations.

The N-dialkylaminoalkyl-N'-dialkylaminoalkyl carboxylic amides of the invention may be prepared by reacting a N - dialkylaminoalkyl - N' - dialkylaminoalkyl amine referred to herein as a "diaminoamine" with one or more carboxylic acids containing from 12–22 carbon atoms, or with one or more esters of one or more of the carboxylic acids set forth, or with combinations of said acids and esters. The amount of acid or esters or combinations thereof should be sufficient to produce about one mol of the aliphatic radical per mol of diaminoamine.

The basic reactions of the diaminoamine with the carboxylic acid and ester are exemplified as follows:

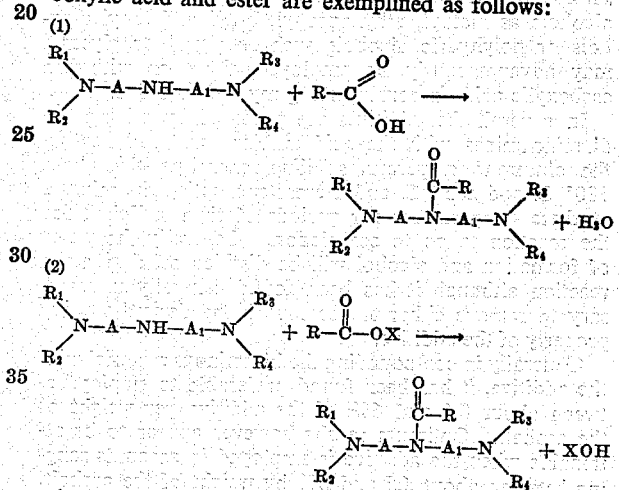

wherein X is an alkyl group.

Suitable diaminoamines which may be employed in making the novel additives may be such bis-(dialkylaminoalkyl) amines as bis-(2-dimethylaminoethyl) amine, bis-(2-diethylaminoethyl) amine, bis-(2-dipropylaminoethyl) amine, bis - (2 - diisopropylaminoethyl) amine, bis - (2 - dibutylaminoethyl) amine, bis-(2-diisobutylaminoethyl) amine, bis-(3-dimethylaminopropyl) amine, bis-(2-dimethylaminopropyl) amine, bis-(1-dimethylaminopropyl) amine, bis-(3-diethylaminopropyl) amine, bis-(2-diethylaminopropyl) amine, bis-(1-diethylaminopropyl) amine, bis - (3 - dipropylaminopropyl) amine, bis-(2-dipropylaminopropyl) amine, bis-(1-dipropylaminopropyl) amine, bis - (3 - diisopropylaminopropyl) amine, bis-(2-diisopropylaminopropyl) amine, bis-(1-diisopropylaminopropyl) amine, bis-(4-dimethylaminobutyl) amine, bis(3-dimethylaminobutyl) amine, bis-(2-dimethylaminobutyl) amine, bis - (1 - dimethylaminobutyl) amine, bis-(4-diethylaminobutyl) amine, bis-(3-diethylaminobutyl) amine, bis-(2-diethylaminobutyl) amine, bis-(1-diethylaminobutyl) amine, bis-(4-dipropylaminobutyl) amine, bis-(3-dipropylaminobutyl) amine, bis-(2-dipropylaminobutyl) amine, bis-(1-dipropylaminobutyl) amine, bis - (4 - diisopropylaminobutyl) amine, bis-(3-diisopropylaminobutyl) amine, bis-(2-diisopropylaminobutyl) amine, bis-(1-diisopropylaminobutyl) amine, bis-(4-dibutylaminobutyl) amine, bis-(3-dibutylaminobutyl) amine, bis-(2-dibutylaminobutyl) amine, bis-(1-dibutylaminobutyl) amine, bis-(4-diisobutylaminobutyl) amine, bis-(3-diisobutylaminobutyl) amine, bis-(2-diisobutylaminobutyl) amine, bis-(1-diisobutylaminobutyl) amine. Other suitable diaminoamines falling under the general classification of N-dialkylaminoalkyl-N′-dialkylaminoalkyl amines and wherein the alkyl groups are unlike are bis-(3-N-methyl-N-ethylaminopropyl) amine, N-methylethylamino-N′-dimethylaminopropyl amine, etc. Other diaminoamines falling within the general classification set forth supra may of course be similarly employed.

To prepare the novel additives, the diaminoamines are reacted with carboxylic acids having from 12–22 carbon atoms such as the fatty acids derived from animal fats or vegetable or fish oils. Some of the saturated carboxylic acids falling within this classification which are suitable reactants are such acids as lauric, tridecoic, myristic, pentadecoic, palmitic, margaric, stearic, nondecoic, arachidic, heneicosoic, and behenic. Suitable unsaturated acids falling within the general classification may also be used such as abeitic, oleic, linoleic, and linolenic or such hydroxy acids such as ricinoleic acid or keto acids such as licanic acid. Similarly fatty acid esters of mono or polyhydric alcohols wherein the fatty acid has from 12–22 carbon atoms may be employed for making the new novel additives by reaction with the suitable diaminoamines. Fatty acid esters of such mono alcohols as methyl, ethyl, propyl, butyl and amyl alcohols or polyhydric alcohols such as glycol or glycerol may advantageously be employed alone or with the carboxylic acids in compounding my new additive.

In general, the additives are prepared by mixing the diaminoamines with the acid and/or ester and heating the mixture to temperatures falling generally within about 180° C. and 275° C. and thereafter reacting the mixture at these temperatures for periods of time sufficient for the reaction to go to completion. Generally the water of formation and alcohol will be distilled off during the reaction although it has been found generally unnecessary to remove either to accomplish the desired wetting property of the additive.

Generally in compounding the bituminous material with the additive, it has been found preferable to employ between about 0.1 and 6% of the additive per weight of the asphalt. Optimum results however appear to be attainable when the additive is employed in amounts ranging between about .25 and 2% by weight of the asphalt.

As mentioned heretofore, the additive is less effective when employed with basic aggregates and in this regard it is preferable to add a second additive selected from the class consisting of aliphatic carboxylic acids having from 12–22 carbon atoms, rosin acids and naphthenic acids. The second additives may be employed in amounts ranging from about .5 to 3 mols of acid per mol of the novel additive. Preferably the second additive is employed in amounts equivalent to about 2 mols of acid per mol of the novel additive with optimum results being obtained when utilized in a mol ratio of between 1.8 and 2.3 mols of acid per mol of primary additive.

The diamino carboxylic amides are preferably mixed with the secondary acid additives and asphaltic compounds in the amounts heretofore set forth prior to employment thereof in paving operations.

Specific examples of the invention are as follows:

Example I

One of the novel additives was prepared by mixing 94 parts of bis-(3-dimethylaminopropyl) amine and 142 parts of stearic acid and thereafter heating the mixture to about 225° C. The mixture was maintained at this temperature for about 6 hours. The water which formed during the reaction was removed by distillation as the reaction progressed. The resulting product $$C_{17}H_{35}CON[CH_2CH_2CH_2N(CH_3)_2]_2$$

was a thermally stable bonding agent useful for promoting adhesion between asphalt compositions and said acid aggregate at elevated temperatures such as normally encountered in road paving operations and for retaining said adhesive properties so as to prevent stripping due to the action of water after paving.

Example II

As another example, 104 parts of a product prepared as in Example I from stearic acid and an impure grade of bis-(3-dimethylaminopropyl) amine may be mixed with 150 parts of tall oil. The resulting composition will be predominantly a mixed organic acid salt of the compound shown in Example I. Bituminous compositions containing this material will readily coat wet basic aggregate even after being maintained at temperatures of about 165° F. for 50 days. The product is also useful in that it prevents stripping due to the action of water after paving.

Example III

As another example, 49.5 pounds of beef tallow and 41 pounds of technical bis-(3-dimethylaminopropyl) amine were mixed and heated at about 225–230° C. for 5 hours. The resulting product consisted predominantly of a mixture of compounds of the formula $$RCON[CH_2CH_2CH_2N(CH_3)_2]_2$$

where R represents a group of aliphatic radicals having from 14–20 carbon atoms. When incorporated in a bituminous composition it maintained its effectiveness as a bonding agent for acidic aggregates after a prolonged period at elevated temperatures and was useful for preventing stripping due to the action of water after paving.

Example IV

As another example, 90.5 pounds of the material prepared in Example III was mixed at 150° C. with 190 pounds of tall oil. The resulting product was predominantly a mixed organic acid salt of mixed N-bis-(dimethylaminopropyl) amides. It maintained its effectiveness as a bonding agent toward basic aggregates when dispersed in asphalt compositions after being maintained at 165° F. for 46 days or at 300° F. for 14 days and was furthermore useful for preventing stripping due to the action of water after paving.

Example V

As an example of the method of measuring the thermal stability of these products, one part of the product made in Example IV was mixed with 100 parts of an asphalt composition designated as MC–3 cutback and maintained at 300° F. for 14 days. At the end of this time the treated cutback asphalt was mixed with wet aggregate to form a paving composition. The cutback readily coated the aggregate particles. After curing at room temperature for one hour the mixture was immersed in water and found to be resistant to the separation of the bituminous material from the aggregate particles.

Example VI

Carboxylic acids containing 12–22 carbon atoms or combinations thereof may be used in place of the stearic acid as set forth in Example I.

Example VII

The tall oil employed in Example II may be replaced by oleic acid or other carboxylic acids containing 12–22 carbon atoms or rosin acids or naphthenic acids.

Example VIII

Other fats or oils may be used in place of beef tallow as set forth in Example III. For example, cocoanut oil, soya oil, various fish oils or other vegetable oils or animal fats may be used.

Having thus described the invention, what is claimed is:
1. As new compositions of matter, mixtures of asphalt with from 0.1 to 6.0% by weight of the asphalt of an additive, said additive being selected from compounds of the formula

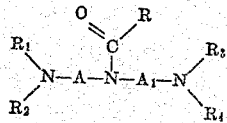

wherein R is a radical selected from the group consisting of alkyl and alkenyl radicals having 11 to 21 carbon atoms, $R_1$, $R_2$, $R_3$ and $R_4$ are alkyl radicals having from 1 to 4 carbon atoms, and A and $A_1$ are alkylene groups having from 2 to 4 carbon atoms.

2. As new compositions of matter, mixtures of asphalt with from 0.25 to 2.0% by weight of the asphalt of an additive, said additive being selected from compounds of the formulae

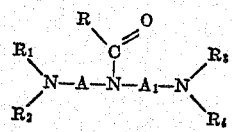

wherein R is a radical selected from the group consisting of alkyl and alkenyl radicals having 11 to 21 carbon atoms, $R_1$, $R_2$, $R_3$ and $R_4$ are alkyl radicals having from 1 to 4 carbon atoms, and A and $A_1$ are alkylene groups having from 2 to 4 carbon atoms.

References Cited in the file of this patent

UNITED STATES PATENTS

| | | |
|---|---|---|
| 2,290,154 | Blair | July 21, 1942 |
| 2,461,971 | Fischer | Feb. 15, 1949 |
| 2,482,586 | Hersberger et al. | Sept. 20, 1949 |
| 2,663,648 | Jelling | Dec. 22, 1953 |
| 2,737,509 | Jelling | Mar. 6, 1956 |

FOREIGN PATENTS

| | | |
|---|---|---|
| 130,484 | Australia | Dec. 6, 1948 |